(12) United States Patent
Vaddi (10) Patent No.: US 10,778,772 B2
(45) Date of Patent: Sep. 15, 2020

(54) CLOUD PLATFORM OR CLOUD PROVIDER SELECTION

(71) Applicant: HEWLETT PACKARD ENTERPRISE DEVELOPMENT LP, Houston, TX (US)

(72) Inventor: Kiran Kumar Vaddi, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/254,682

(22) Filed: Jan. 23, 2019

(65) Prior Publication Data

US 2020/0236169 A1 Jul. 23, 2020

(51) Int. Cl.
*H04L 29/08* (2006.01)
*G06F 9/54* (2006.01)

(52) U.S. Cl.
CPC .......... *H04L 67/1097* (2013.01); *G06F 9/547* (2013.01)

(58) Field of Classification Search
CPC .............................. H04L 67/1097; G06F 9/547
USPC ......................................................... 709/219
See application file for complete search history.

(56) References Cited

U.S. PATENT DOCUMENTS

| | | | | |
|---|---|---|---|---|
| 8,244,874 B1* | 8/2012 | Thireault | ............. | G06F 9/5055 709/226 |
| 8,930,541 B2 | 1/2015 | Assuncao et al. | | |
| 9,552,232 B2 | 1/2017 | Mukherjee et al. | | |
| 10,447,806 B1* | 10/2019 | Sahay | ..................... | H04L 41/12 |
| 2011/0022812 A1* | 1/2011 | van der Linden | .... | G06F 9/5077 711/163 |
| 2012/0137002 A1* | 5/2012 | Ferris | ..................... | G06F 9/5072 709/226 |
| 2012/0198073 A1 | 8/2012 | Srikanth et al. | | |
| 2012/0239739 A1* | 9/2012 | Manglik | ............... | G06F 9/5077 709/203 |
| 2012/0239792 A1* | 9/2012 | Banerjee | ............. | H04L 67/1097 709/223 |

(Continued)

OTHER PUBLICATIONS

Badger et al., "Draft Cloud Computing Synopsis and Recommendations", Special Publication 800-146, May 29, 2012, 86 pages.

(Continued)

*Primary Examiner* — Nicholas R Taylor
*Assistant Examiner* — Chong G Kim
(74) *Attorney, Agent, or Firm* — Jaffery Watson Mendonsa & Hamilton (57) ABSTRACT

In some examples, a system receives information indicating resources relating to a workload, and receives information indicating relative priorities of a plurality of factors that affect placement of the workload on a cloud platform. For each respective cloud platform of a plurality of cloud platforms, the system computes factor values representing respective factors of the plurality of factors, the factor values computed for the respective cloud platform dependent upon information pertaining to the plurality of factors provided for the respective cloud platform, and computes an aggregate score based on the factor values for the respective cloud platform and weights assigned to the factor values based on the relative priorities. The system selects, for placement of the workload, a cloud platform from among the plurality of cloud platforms based on the aggregate scores.

19 Claims, 5 Drawing Sheets

(56) References Cited

U.S. PATENT DOCUMENTS

| | | | | |
|---|---|---|---|---|
| 2013/0067090 | A1* | 3/2013 | Batrouni | H04L 67/1097 709/226 |
| 2013/0117157 | A1* | 5/2013 | Iyoob | G06Q 30/06 705/26.41 |
| 2013/0297770 | A1* | 11/2013 | Zhang | G06F 9/505 709/224 |
| 2014/0201218 | A1* | 7/2014 | Catalano | G06Q 10/0631 707/748 |
| 2015/0143366 | A1* | 5/2015 | Suragi Math | G06F 9/5072 718/1 |
| 2015/0163285 | A1* | 6/2015 | Chakra | G06F 9/5027 709/201 |
| 2015/0169366 | A1* | 6/2015 | Billore | G06F 9/5038 718/103 |
| 2015/0304231 | A1* | 10/2015 | Gupte | H04L 67/10 709/226 |
| 2015/0381425 | A1* | 12/2015 | Kansal | H04L 41/0896 709/224 |
| 2016/0205037 | A1* | 7/2016 | Gupte | H04L 67/10 709/226 |
| 2018/0041580 | A1* | 2/2018 | Kadowaki | G06F 3/0604 |
| 2018/0260251 | A1* | 9/2018 | Beveridge | G06F 9/5027 |
| 2018/0367631 | A1* | 12/2018 | Son | H04L 67/2809 |
| 2019/0130327 | A1* | 5/2019 | Carpenter | G06Q 10/0635 |
| 2019/0132222 | A1* | 5/2019 | Son | H04L 47/805 |
| 2019/0312939 | A1* | 10/2019 | Noble | G06F 21/602 |
| 2020/0034057 | A1* | 1/2020 | Srinivasan | H04L 41/0806 |

OTHER PUBLICATIONS

Jung et al., "CloudAdvisor: A Recommendation-as-a-Service Platform for Cloud Configuration and Pricing", IEEE Ninth World Congress on Services, Jun. 2013, 9 pages.

Kulkarni; S.; "OpenStack Cloud Orchestration—Automation for Cloud Infrastructure Deployment"; Mar. 10, 2017; 7 pages.

* cited by examiner

CLOUD PLATFORM OR CLOUD PROVIDER SELECTION

BACKGROUND

Cloud computing refers to delivery of services over a network, such as the Internet or other type of network. Tenants of a cloud are able to access the services upon request of the tenants. By using the services of a cloud provided by a cloud provider, a tenant can avoid the costs associated with maintaining infrastructure including hardware equipment and programs that the tenant would otherwise have to deploy.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A workload for an application of a tenant can employ various different types of resources. A tenant can refer to a human user, an enterprise (e.g., a business concern, a government agency, an educational organization, etc.), a machine, or a program (that includes machine-readable instructions). Examples of different types of resources can include any or some combination of the following: processing resources (e.g., server computers, processors, etc.), storage resources (e.g., disk drives, solid state memories, memory devices, etc.), communication resources (e.g., routers, switches, gateways, etc.), virtual resources (e.g., virtual machines, containers, virtual networks, etc.), databases, programs (e.g., applications, operating systems, load balancers, firmware, or other machine-executable instructions), network addresses, storage accounts, or other functions.

A "workload" can refer to a collection of tasks to be performed. An "application" can refer to a (program or a collection of programs) and any associated components that can be used by a tenant to perform a workload.

There may be multiple different possible cloud platforms on which a workload can be placed. A "cloud platform" can refer to any collection of resources on which a workload can execute. In some examples, different cloud platforms can refer to cloud platforms of different cloud providers. In other examples, different cloud platforms can refer to cloud platforms of one cloud provider. A "cloud provider" can refer to an entity that manages a cloud and that offers resources and services that are accessible by tenants of the cloud.

Selecting a cloud platform from among multiple different cloud platforms on which a workload is to be placed can be complex. If the selection is performed manually, the cloud platform selection can be time-consuming and may not be optimal (in other words, a workload deployed on manually selected cloud platform(s) may have a reduced performance). Also, in some examples, the selection of cloud platform(s) for workload placement may not consider various factors that may affect which cloud platform is more optimal for the workload than another cloud platform.

In accordance with some implementations of the present disclosure, techniques or mechanisms are provided to select a cloud platform from among multiple cloud platforms (of a single cloud provider or of multiple cloud providers) on which to deploy a workload of a cloud tenant. Note that selecting "a cloud platform" can refer to selecting one cloud platform or selecting multiple cloud platforms on which the workload is to be deployed.

A system receives information indicating resources relating to a workload, and receives information indicating relative priorities of a collection of factors that affect placement of the workload on a cloud platform. For each respective cloud platform, the system computes factor values representing respective factors in the collection of factors. The factor values are computed for the respective cloud platform dependent upon information pertaining to the collection of factors provided for the respective cloud platform. The system computes an aggregate score based on the factor values for the respective cloud platform and weights assigned to the factor values based on the relative priorities. The system selects, for placement of the workload, a cloud platform from among the plurality of cloud platforms based on comparing aggregate scores computed for different cloud platforms.

Figure 1A:
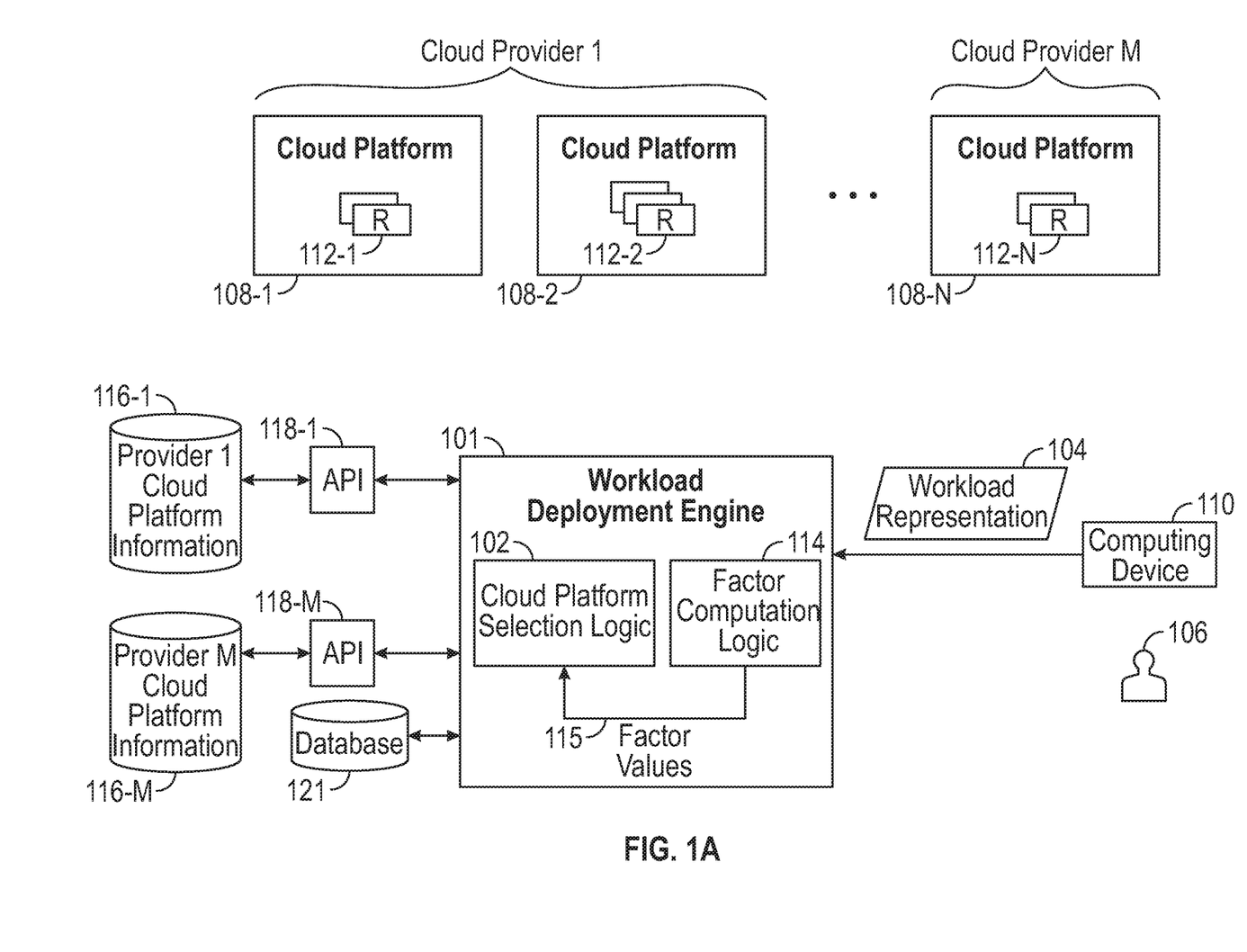
FIG. 1A is a block diagram of an arrangement that includes a cloud platform selection engine according to some examples.

FIG. 1A is a block diagram of an example arrangement that includes a workload deployment engine 101 to deploy a workload represented by a workload representation 104 to selected cloud platforms. As used here, an "engine" can refer to a hardware processing circuit, which can include any or some combination of a microprocessor, a core of a multicore microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The workload deployment engine 101 includes a cloud platform selection logic 102 that is able to select, for the workload represented by the workload representation 104, a cloud platform from among cloud platforms 108-1, 108-2, ..., 108-N, where N>1. The selected platform includes a subset of the cloud platforms 108-1, 108-2, ..., 108-N, where the subset can include one cloud platform or multiple cloud platforms up to N cloud platforms.

The workload representation 104 of the workload to be deployed on a cloud platform(s) can be provided by a computing device 110, based on input from the tenant 106. Examples of the computing device 110 include any or some combination of a desktop computer, a notebook computer, a tablet computer, a smartphone, and so forth.

In the example of FIG. 1A, cloud platforms 108-1 and 108-2 are associated with cloud provider 1, and cloud platform 108-N is associated with cloud provider M (where M>1). In other examples, the multiple cloud platforms 108-1 to 108-N are associated with one cloud provider.

Each cloud platform 108-$i$ ($i$=1 to N) includes a respective set of resources 112-$i$. Examples of resources are listed further above. A workload deployed on a cloud platform refers to the workload using certain resources of the cloud platform. In examples where a workload is deployed on multiple cloud platforms, the resources of the multiple cloud platforms are used in performing the workload.

The workload deployment engine 101 also includes a factor computation logic 114, for computing values ("factor values" 115) of various factors to be used by the cloud platform selection logic 102 in selecting a cloud platform for deployment of the workload. The factors may affect which cloud platform is more optimal for a workload than another cloud platform.

Each of the cloud platform selection logic 102 and the factor computation logic 114 is implemented as a respective portion of the hardware processing circuit of the workload deployment engine 101, or alternatively, includes machine-readable instructions executable by the workload deployment engine 101.

Information used by the factor computation logic 114 to compute the values 115 of the factors can be obtained from data repositories 116-1 to 116-M. For example, the data repository 116-1 includes cloud platform information for cloud provider 1, and the data repository 116-M includes cloud platform information for cloud provider M. For example, each data repository can include a data source owned by a respective cloud provider, and which can be accessed using a respective software development kit (SDK) or by another mechanism. A data repository can include documentation provided by the respective cloud provider, or can include another source of information.

The factor computation logic 114 can employ respective interfaces to access the corresponding cloud platform information in the data repositories 116-1 to 116-M. In some examples, the interfaces include application programming interfaces (APIs) 118-1 to 118-M. An API includes a library of routines that can be called by the factor computation logic 114 to retrieve respective information. For example, the factor computation logic 114 can call the API 118-1 to retrieve cloud platform information from the data repository 116-1, and the factor computation logic 114 can use the API 118-M to retrieve cloud platform information from the data repository 116-M.

In other examples, other types of interfaces can be employed to access the data repositories 116-1 to 116-M, such as web interfaces through which the factor computation logic 114 is able to access the respective cloud platform information at a corresponding website or web server.

Examples of factors for which the factor computation logic 114 computes the factor values 115 are discussed below. Although specific examples of factors are provided, it is noted that in other examples, the factor computation logic 114 can compute factor values 115 for additional or alternative factors.

The factor values 115 are provided from the factor computation logic 114 to the cloud platform selection logic 102 for use by the cloud platform selection logic 102 in selecting a cloud platform for a workload.

Figure 1B:
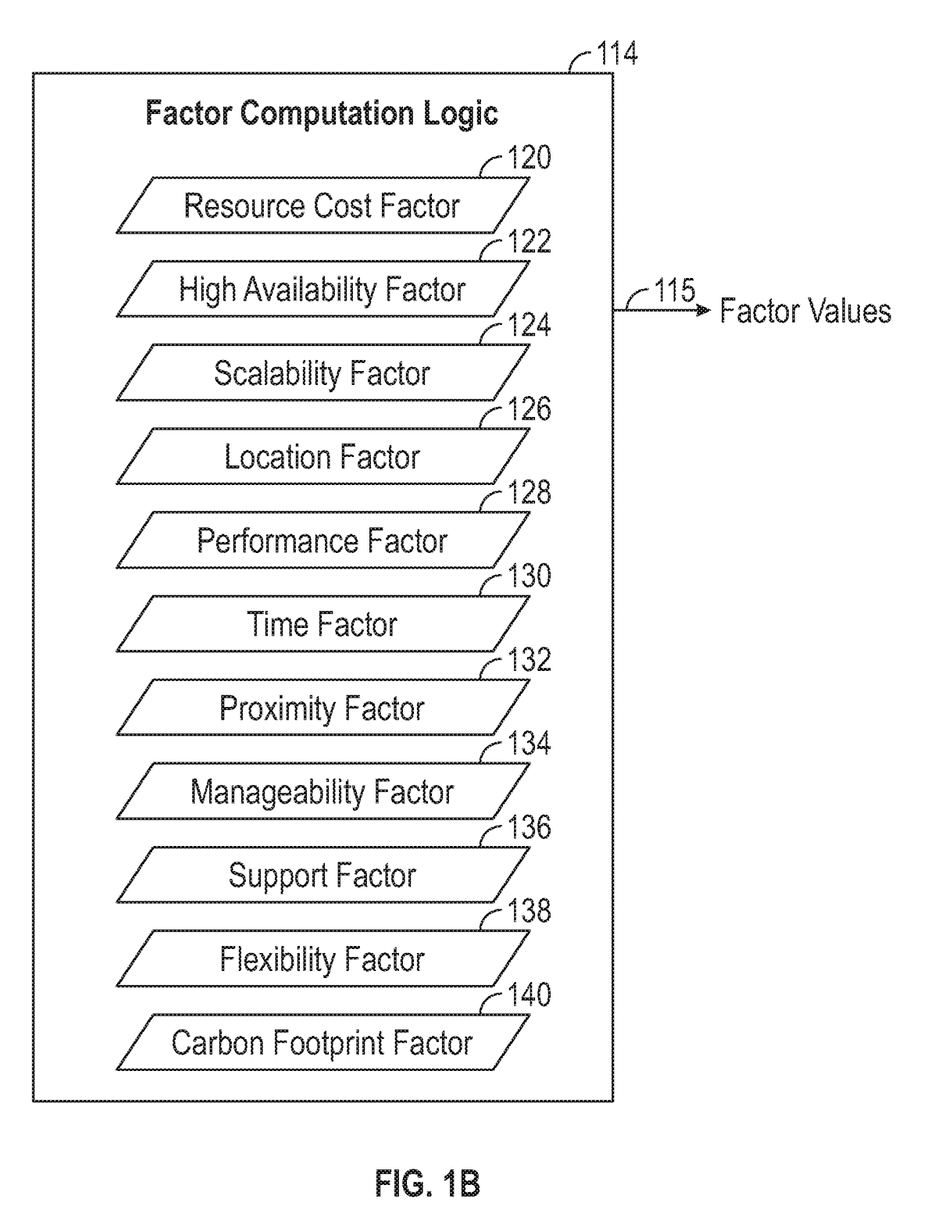
FIG. 1B is a block diagram showing factor values for multiple factors, as computed by a factor computation logic, according to some examples.

As shown in FIG. 1B, the factors can include any or some combination of the following: a resource cost factor 120, a high availability factor 122, a scalability factor 124, a location factor 126, a performance factor 128, a time factor 130, a proximity factor 132, a manageability factor 134, a support factor 136, a multi-cloud flexibility factor 138, and a carbon footprint factor 140.

The resource cost factor 120 is a factor representing the cost of a resource (or a collection of resources) of a cloud platform. For example, a cloud provider can include a price list or other cost information that includes the costs of respective different resources offered by the cloud provider (e.g., cost of a resource per unit time). The price list can be included as part of the respective cloud provider's cloud platform information, stored in one of the data repositories 116-1 to 116-M.

The high availability factor 122 can specify costs associated with different service levels, such as service levels defined by respective service level agreements (SLAs). For example, a cloud provider can include cost information in a data repository 116-$j$ ($j$=1 to M) that includes the costs of respective different service levels (e.g., service level 1 is associated with a first cost, service level 2 is associated with a second cost, etc.). For a given service level, one cloud platform may be more costly than another cloud platform. Thus, if the workload 104 specifies that a particular service level is to be used, then the relative costs associated with provision of the particular service level by different cloud platforms can be compared by the cloud platform selection logic 102 in deciding which cloud platform is selected for a workload.

The scalability factor 124 represents scalability of resources of a cloud platform. For example, the respective cloud platform information in the data repository 116-$j$ may specify that a maximum quantity of a given resource can be used. Thus, given a workload, the cloud platform selection logic 102 can determine whether the workload may employ a greater number of resources at certain times (e.g., such as at peak usage times), and whether any scalability restrictions are imposed for a cloud platform such that the cloud platform may not have an available quantity of resources to meet the peak usage demand of the workload. Thus, the cloud platform selection logic 102 can cause selection of a cloud platform that is more likely to meet increased usage demands of the workload.

The location factor 126 indicates available locations for corresponding resources. For example, the respective cloud platform information in the data repository 116-$j$ may specify that different resources may be available from different geographic regions, such as different cities, different states, different countries, and so forth. The workload may be deployed at a given location, and the location factor can be used to determine which of the cloud platform to be selected based on where resources of the corresponding cloud platforms are located. For example, if the workload is to be deployed in a given country, then it may make more sense to select a cloud platform that has resources in the given country, to avoid any government regulatory issues that may be associated with employing resources of a different country for the workload that is being performed in the given country.

The performance factor 128 indicates performance levels of different resources, such as a processing resource, a storage resource, a network resource, a database resource, a virtual resource, a program, a network address, a storage account, and so forth. The respective cloud platform information in the data repository 116-*j* can include information of different performance levels of respective resources. For example, a performance level of a processing resource may be expressed as a number of processing operations per unit time, a performance level of a storage resource may be expressed as a storage capacity and/or a storage access time, a performance level of a network resource can be expressed as a bandwidth and/or latency of the network resource, and so forth. The performance levels of the respective resources are considered by the cloud platform selection logic 102 in determining which cloud platform has the resources to meet demands of a workload. For example, if the workload is processing intensive (e.g., the workload involves image processing, or other intensive computation tasks), then the cloud platform selection logic 102 may select the cloud platform with processing resources that have higher performance levels may be selected. On the other hand, if the workload is storage intensive (e.g., the workload stores massive amounts of data), then the cloud platform selection logic 102 may select the cloud platform that has larger capacity storage resources.

The time factor 130 indicates costs associated with timings in reserving resources of cloud platforms for deploying the workload 104. For example, respective cloud platform information in the data repository 116-*j* can indicate that if a tenant reserves resources of a cloud platform ahead of time, then the cost of such resources can be reduced as compared to a tenant that reserves the resources of the cloud platform closer in time to when the workload is to be deployed. As another example, the time factor 130 can indicate time intervals during which the cost of resources is reduced as compared to other time intervals. For example, resources of a cloud platform may be less costly outside of business hours.

The proximity factor 132 indicates proximity of resources of a cloud platform to a location of the workload 104. The proximity factor 132 can indicate that resources closer to the location of the workload 104 is less costly than resources geographically farther away from the workload 104, based on respective cloud platform information in the data repository 116-*j*.

The manageability factor 134 indicates management tools that are available for auditing, troubleshooting, costing, and reporting with respect to the workload being deployed on the corresponding cloud platform. Information of the manageability tools are included in the respective cloud platform information in the data repository 116-*j*. The cloud platform selection logic 102 may determine that a tenant has specified that certain manageability tools be available for a workload, in which case the cloud platform selection logic 102 can select the cloud platform with the manageability tools.

The support factor 136 provides an indication of the support that is available for a respective cloud platform, based on the respective cloud platform information in the data repository 116-*j*. Examples of different types of support that can be offered include email support, chat support, call support, and so forth. Moreover, there may be different service levels associated with different levels of support. A tenant may request that a certain type or level of support be provided, in which case the cloud platform selection logic 102 can select the cloud platform with the requested type or level of support.

The multi-cloud flexibility factor 138 indicates whether or not a deployment of a workload can utilize a multi-cloud environment, i.e., an environment in which cloud platforms of multiple cloud providers can be used. The respective cloud platform information in the data repository 116-*j* can include information specifying whether the cloud platform supports multi-cloud deployment of a workload. Some workloads may benefit from using different cloud platforms from different cloud providers. For such workloads, the cloud platform selection logic 102 may select cloud platforms that support multi-cloud deployment.

The carbon footprint factor 140 indicates the carbon footprint associated with use of the respective cloud platform. The carbon footprint information can be included in the respective cloud platform information in the data repository 116-*j*. A tenant may specify that a cloud platform selected have a carbon footprint below a threshold level.

Note that a tenant can specify which of the factors are mandatory and which are non-mandatory. Mandatory factors are to be considered by the cloud platform selection logic 102, while non-mandatory factors may or may not be considered by the cloud platform selection logic 102 in selecting a cloud platform.

Figure 2:
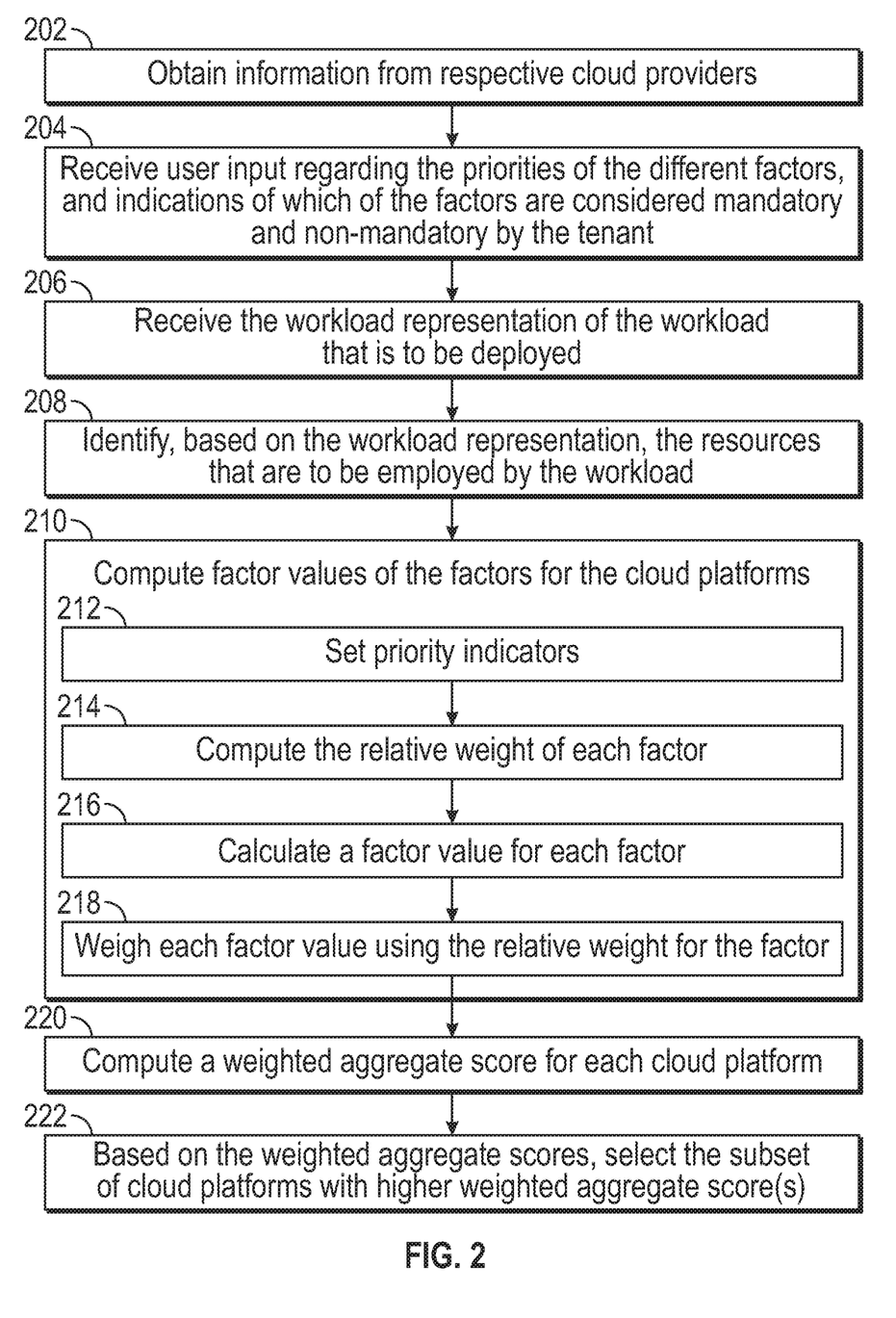
FIG. 2 is a flow diagram of a process according to some examples.

FIG. 2 is a flow diagram of a process that can be performed by the workload deployment engine 101 according to some examples. The workload deployment engine 101 obtains (at 202) information from respective cloud providers, such as through the APIs 118-1 to 118-M for accessing the respective data repositories 116-1 to 116-M. The obtained information can include information relating to the factors discussed above, as well as other information of cloud platforms. In some examples, the workload deployment engine 101 can populate a database 121 (FIG. 1) with the obtained information.

The workload deployment engine 101 receives (at 204) user input regarding the priorities of the different factors, as well as indications of which of the factors are considered mandatory and non-mandatory by the tenant. For example, the workload deployment engine 101 can present a graphical user interface (GUI) in a display device of the computing device 110 of the tenant 106 (FIG. 1). The GUI can include a list of the factors, for which the tenant 106 can provide respective priority information and the information regarding which of the factors are considered mandatory and non-mandatory. Note that the tenant 106 can simply order the collection of factors, such as in ascending or descending priority order, which implicitly provides the priority of each factor.

The workload deployment engine 101 receives (at 206) the workload representation 104 of the workload that is to be deployed. For example, the workload representation 104 can be in the form of template, implemented as a text file or a file according to a different format. For example, the template can include information relating to resources to be used, and links between the resources to indicate functional relationships between the resources. In further examples, a template can also include information relating to some of the factors (e.g., scalability factor 124, location factor 126, etc.). In such examples, the factor(s) included in the template can be considered mandatory factor(s). Alternatively, the workload representation 104 can be input by the tenant 106 into the GUI presented by the workload deployment engine 101 at the computing device 110.

The workload representation 104 can include information specifying components of the workload, where the components can indicate what tasks are to be performed in a temporal or other order. In a specific example, the components of the workload can include virtual machines (VMs). The workload representation 104 can also include information indicating requirements for the workload (or components of the workload), including any or some combination of: resources requested, a service level, a target threshold cost, resource usage demands, time(s) for deploying the workload, a geographic location(s) for the workload, manageability and/or support specified by the tenant, a threshold carbon footprint, and so forth.

In some examples, the workload representation 104 can identify a group, which can include a set of VMs. The group can specify a minimum number of VMs in the set, and a maximum number of VMs in the group.

The workload deployment engine 101 identifies (at 208), based on the workload representation 104, the resources that are to be employed by the workload. The identified resources can include the resources specified in the workload representation 104. Alternatively, the identified resources can be based on the workload deployment engine 101 making a determination of what resources are to be used based on the tasks of the workload. As examples, a data processing task of the workload would use a processing resource, while a data storage task of the workload would use a storage resource.

The factor computation logic 114 computes (at 210) factor values (115 in FIG. 1) of the factors for the cloud platforms. A factor value is computed for each factor of a collection of factors to be considered for the workload. Note that the collection of factors can include a subset (less than all) of the factors listed above, such as the factors identified as mandatory by a tenant as discussed above.

As noted above, in some examples, the tenant 106 may order the factors by priority specified. Based on the order of the factors, the factor computation logic 114 can assign relative weights to the factors. Assuming there are p factors, then the factor computation logic 114 can set (at 212) the following priority indicators $\{x_1, x_2, x_3, \ldots, x_p\}$ as follows, in some examples.

$$x_1=p, x_2=p-1, x_3=p-2 \ldots, x_p=1.$$

Each priority indicator, $x_k$ (k=1 to p), represents the priority of the corresponding factor k. A higher priority indicator value can indicate a higher priority. In other examples, a different way of assigning priority indicators can be employed. For example, the priority indicators of factors may be input by a user, or alternatively, a different way of computing priority indicators can be used.

In some examples, the factor computation logic 114 uses the foregoing priority indicators to compute (at 214) the relative weight of each factor k, as follows:

$$w_k = \frac{x_k}{100 \cdot \sum (x_1 \ldots x_p)}. \quad \text{(Eq. 1)}$$

In other examples, other ways of computing relative weights can be used.

For each factor, the factor computation logic 114 calculates (at 216) a factor value (e.g., factor value 115 in FIG. 1). The following describes an example associated with the resource cost factor 120. Similar techniques can be applied for the other factors.

The resource cost is determined for each type of resource based on information provided by a cloud provider. The total resource cost (Total_cost) of deployment of the workload on cloud platform i (i=1 to N, where N is the number of cloud platforms) can be calculated using:

$$\text{Total\_cost}(i)=r_1 c_1 + r_2 c_2 + \ldots + r_n c_n, \quad \text{(Eq. 2)}$$

where $r_x$ (x=1 to n) represents the cost (or other resource value) of the respective resource x (assuming n resources where n>1), and $c_x$ represents a quantity of the respective resource x.

The total resource cost (Total_cost) computed according to Eq. 2 is the total cost for a corresponding cloud platform i.

The resource cost factor value (Resource_factor_value) is computed based on the total resource cost (Total_cost) calculated according to Eq. 2, as follows:

$$\text{Resource\_factor\_value}(j) \times 100 = \text{Total\_cost}(i), \quad \text{(Eq. 3)}$$

The resource cost factor value can be represented as a percentage in some examples. A lower resource cost is associated with a higher factor value.

Each factor value, Factor_value(k), computed by the factor computation logic 114 is weighted (at 218) using the relative weight $w_k$ computed for the respective factor value, as follows:

$$w_k \cdot \text{Factor\_value}(k).$$

The factor computation logic 114 can provide the weighted factor values to the cloud platform selection logic 102.

The cloud platform selection logic 102 can compute (at 220) a weighted aggregate score, Weighted Aggregate (i), such as a weighted average, for a cloud platform i, as follows:

$$\text{Weighted Aggregate}(i)=w_1 \cdot \text{Factor\_value}(1)+ \\ w_2 \cdot \text{Factor\_value}(2)+ \ldots +w_p \cdot \text{Factor\_value}(p). \quad \text{(Eq. 4)}$$

The cloud platform selection logic 102 can order the cloud platforms according to the weighted aggregate scores in an order, such as a descending order. Based on the weighted aggregate scores, the cloud platform selection logic 102 can select (at 222) the subset of cloud platforms with higher weighted aggregate score(s). The selected subset of cloud platforms can include one cloud platform or multiple cloud platforms.

In further examples, the cloud platform selection logic 102 can select different cloud platforms for different resources. For example, the cloud platform selection logic 102 can select a first cloud platform to use a processing resource of the first cloud platform for a workload, select a second cloud platform to use a storage resource of the second cloud platform for the workload, and so forth. In such examples, the costs of resources can be considered individually instead of combined to compute a total cost according to Eq. 2.

Figure 3:
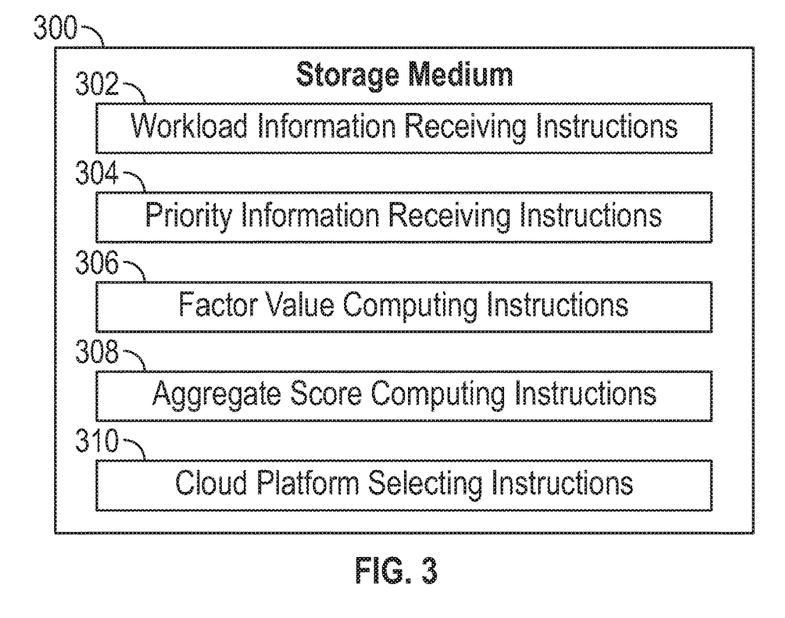
FIG. 3 is a block diagram of a storage medium storing machine-readable instructions according to some examples

FIG. 3 is a block diagram of a non-transitory machine-readable or computer-readable storage medium 300 that stores machine-readable instructions that upon execution cause a system to perform various tasks. The machine-readable instructions include workload information receiving instructions 302 that receives information indicating resources relating to a workload. Such information can include the workload representation 104 of FIG. 1, for example. The machine-readable instructions further include priority indication receiving instructions 304 to receive information indicating relative priorities of multiple factors that affect placement of the workload on a cloud platform.

The following machine-readable instructions perform tasks for respective cloud platforms of multiple cloud platforms, which can be provided by a cloud provider or multiple cloud providers. Factor value computing instructions 306 compute factor values representing respective factors of the multiple factors, the factor values computed for the respective cloud platform dependent upon information pertaining to the multiple factors provided for the respective cloud platform. For example, a factor value can be computed according to Eq. 3 above.

Aggregate score computing instructions 308 compute an aggregate score based on the factor values for the respective cloud platform and weights assigned to the factor values based on the relative priorities. For example, the weights are computed according to Eq. 1 above, and the aggregate score is computed according to Eq. 4 above.

The machine-readable instructions further include cloud platform selecting instructions 310 to select, for placement of the workload, a cloud platform from among the multiple cloud platforms based on the aggregate scores. For example, selecting the cloud platform is based on comparing the aggregate scores.

Figure 4:
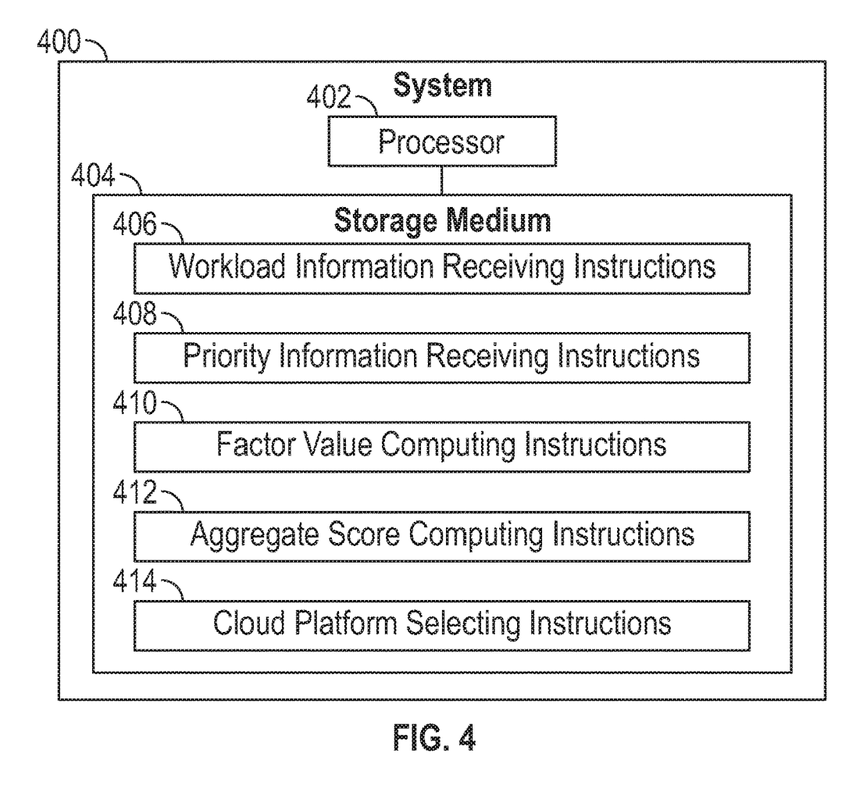
FIG. 4 is block diagram of a system according to some examples.

FIG. 4 is a block diagram of a system 400 including a hardware processor 402 and a storage medium 404 storing machine-readable instructions executable on the hardware processor 402 to perform various tasks. A hardware processor can include a microprocessor, a core of a multi-core microprocessor, a microcontroller, a programmable integrated circuit, a programmable gate array, a digital signal processor, or another hardware processing circuit.

Machine-readable instructions executable on a hardware processor can refer to the instructions executable on a single hardware processor or the instructions executable on multiple hardware processors.

The machine-readable instructions include workload information receiving instructions 406 to receive information indicating resources relating to a workload. The machine-readable instructions further include priority information receiving instructions 408 to receive information indicating relative priorities of multiple factors that affect placement of the workload on a cloud platform. The information indicating the relative priorities of the plurality of factors can be received based on user input.

The following machine-readable instructions perform tasks for respective cloud platforms of multiple cloud platforms. Factor value computing instructions 410 compute factor values representing respective factors of the multiple factors, the factor values computed for the respective cloud platform dependent upon information pertaining to the multiple factors provided for the respective cloud platform, and where a factor value of a first factor of the plurality of factors is computed based on aggregating resource values representing the resources.

The information pertaining to the multiple factors can be obtained from each respective cloud provider by accessing an interface (e.g., an API) of the respective cloud provider. In other examples, information pertaining to the multiple factors may be obtained from other sources, such as documentation provided by cloud providers.

Aggregate score computing instructions 412 compute an aggregate score based on the factor values for the respective cloud platform and weights assigned to the factor values based on the relative priorities.

The machine-readable instructions further include cloud platform selecting instructions 414 to select, for placement of the workload, a cloud platform from among the multiple cloud platforms based on the aggregate scores.

Figure 5:
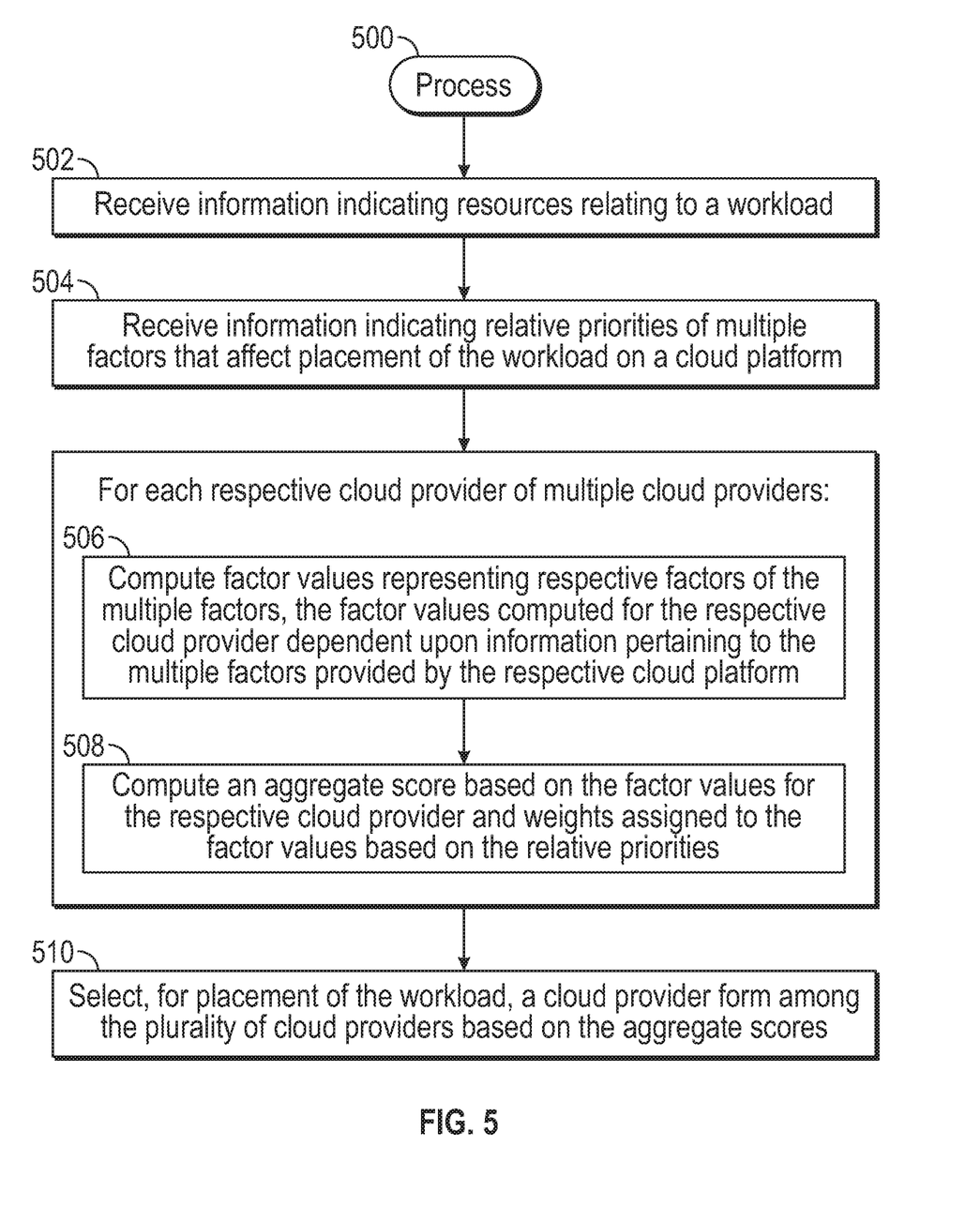
FIG. 5 is a flow diagram of a process according to further examples.

FIG. 5 is a flow diagram of a process 500 according to some examples. The process 500 includes receiving (at 502) information indicating resources relating to a workload. The process 500 includes receiving (at 504) information indicating relative priorities of multiple factors that affect placement of the workload on a cloud platform. For each respective cloud provider of multiple cloud providers, the process 500 includes computing (at 506) factor values representing respective factors of the multiple factors, the factor values computed for the respective cloud provider dependent upon information pertaining to the multiple factors provided by the respective cloud platform, and computing (at 508) an aggregate score based on the factor values for the respective cloud provider and weights assigned to the factor values based on the relative priorities.

The process 500 includes selecting (at 510), for placement of the workload, a cloud provider from among the plurality of cloud providers based on the aggregate scores. The workload can be deployed on a cloud platform(s) of the selected cloud provider. In further examples, the selecting can select multiple cloud providers, and the workload can be deployed on the cloud platforms of the selected cloud providers.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    receive information indicating resources relating to a workload;
    receive information indicating relative priorities of a plurality of factors that affect placement of the workload on a cloud platform, wherein a first factor of the plurality of factors is related to the resources;
    for each respective cloud platform of a plurality of cloud platforms:
        compute factor values representing respective factors of the plurality of factors, the factor values computed for the respective cloud platform dependent upon information pertaining to the plurality of factors provided for the respective cloud platform, and compute an aggregate score based on the factor values for the respective cloud platform and weights assigned to the factor values based on the relative priorities; and select, for placement of the workload, a cloud platform from among the plurality of cloud platforms based on the aggregate scores, wherein the information indicating the resources relating to the workload is included in a template, the template including information linking the resources, and wherein the information linking the resources indicate a functional relationship between the resources.

2. The non-transitory machine-readable storage medium of claim 1, wherein selecting the cloud platform is based on comparing the aggregate scores.

3. The non-transitory machine-readable storage medium of claim 1, wherein computing the factor value of the first factor for the respective cloud provider comprises aggregating resource values representing the resources.

4. The non-transitory machine-readable storage medium of claim 3, wherein the resource values represent respective costs of the resources.

5. The non-transitory machine-readable storage medium of claim 1, wherein the plurality of cloud platforms comprise cloud platforms of respective different cloud providers.

6. The non-transitory machine-readable storage medium of claim 5, wherein the instructions upon execution cause the system to:

obtain information of the plurality of factors from each respective cloud provider of the different cloud providers by calling an application programming interface (API) of the respective cloud provider.

7. The non-transitory machine-readable storage medium of claim 1, wherein the plurality of cloud platforms comprise cloud platforms of a cloud provider.

8. The non-transitory machine-readable storage medium of claim 1, wherein the plurality of factors comprise multiple factors selected from among: a resource cost factor, a high availability factor, a scalability factor, a location factor, a performance factor, a time factor, a proximity factor, a manageability factor, a support factor, a multi-cloud flexibility factor, and a carbon footprint factor.

9. A system comprising:
a processor; and
a non-transitory storage medium storing instructions executable on the processor to:
receive information indicating resources relating to a workload;
receive information indicating relative priorities of a plurality of factors that affect placement of the workload on a cloud platform;
for each respective cloud platform of a plurality of cloud platforms:
compute factor values representing respective factors of the plurality of factors, the factor values computed for the respective cloud platform dependent upon information pertaining to the plurality of factors provided for the respective cloud platform, wherein a factor value of a first factor of the plurality of factors is computed based on aggregating resource values representing the resources, and
compute an aggregate score based on the factor values for the respective cloud platform and weights assigned to the factor values based on the relative priorities; and select, for placement of the workload, a cloud platform from among the plurality of cloud platforms based on the aggregate scores, wherein the information indicating the resources relating to the workload is included in a template, the template including information linking the resources, and wherein the information linking the resources indicate a functional relationship between the resources.

10. The system of claim 9, wherein the information indicating the relative priorities of the plurality of factors is received based on user input.

11. The system of claim 9, wherein the plurality of cloud platforms are provided by respective different cloud providers, and wherein the selecting of the cloud platform for placement of the workload comprises selecting a cloud provider of the different cloud providers.

12. The system of claim 11, wherein the instructions are executable on the processor to:
obtain information of the plurality of factors from each respective cloud provider of the different cloud providers by accessing an interface of the respective cloud provider.

13. The system of claim 9, wherein the resource values represent respective costs of the resources.

14. The system of claim 9, wherein the resources comprise a resource selected from among a processing resource, a storage resource, a communication resource, a virtual resource, a database, a program, a network address, and a storage account.

15. A method performed by a system comprising a hardware processor, comprising:
receiving information indicating resources relating to a workload;
receiving information indicating relative priorities of a plurality of factors that affect placement of the workload on a cloud platform;
for each respective cloud provider of a plurality of cloud providers:
computing factor values representing respective factors of the plurality of factors, the factor values computed for the respective cloud provider dependent upon information pertaining to the plurality of factors provided by the respective cloud platform, and
computing an aggregate score based on the factor values for the respective cloud provider and weights assigned to the factor values based on the relative priorities; and
selecting, for placement of the workload, a cloud provider from among the plurality of cloud providers based on the aggregate scores, wherein the information indicating the resources relating to the workload is included in a template, the template including information linking the resources, and wherein the information linking the resources indicate a functional relationship between the resources.

16. The method of claim 15, wherein the workload is deployed on a cloud platform of the selected cloud provider.

17. The method of claim 15, further comprising accessing the information pertaining to the plurality of factors using an interface of the respective cloud platform.

18. The method of claim 15, wherein the plurality of factors comprise multiple factors from among: a resource cost factor, a high availability factor, a scalability factor, a location factor, a performance factor, a time factor, a proximity factor, a manageability factor, a support factor, a multi-cloud flexibility factor, and a carbon footprint factor.

19. The method of claim 8, wherein the template includes mandatory factors.

* * * * *